United States Patent
Yang

(10) Patent No.: US 8,760,569 B2
(45) Date of Patent: Jun. 24, 2014

(54) EXTERNAL LENS DEVICE AND PORTABLE ELETRONIC DEVICE USING SAME

(75) Inventor: Gang Yang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 13/566,038

(22) Filed: Aug. 3, 2012

(65) Prior Publication Data

US 2013/0107109 A1 May 2, 2013

(30) Foreign Application Priority Data

Oct. 31, 2011 (CN) .......................... 2011 1 0337208

(51) Int. Cl.
*H04N 5/225* (2006.01)

(52) U.S. Cl.
CPC .................................. *H04N 5/2252* (2013.01)
USPC ....................................................... 348/373

(58) Field of Classification Search
CPC . H04M 1/0264; H04N 5/2253; H04N 5/2254; H04N 5/252; G02B 7/02; G06F 1/1632; G03B 16/042
USPC ....................................................... 348/373
See application file for complete search history.

(56) References Cited

U.S. PATENT DOCUMENTS

| | | | | |
|---|---|---|---|---|
| 7,139,473 | B2 * | 11/2006 | Shimano et al. | 396/73 |
| 8,279,544 | B1 * | 10/2012 | O'Neill | 359/827 |
| 8,385,004 | B2 * | 2/2013 | Hicks | 359/699 |
| 8,388,243 | B1 * | 3/2013 | Smith | 396/422 |
| 2003/0090579 | A1 * | 5/2003 | Ohe et al. | 348/240.3 |
| 2005/0270484 | A1 * | 12/2005 | Maeda et al. | 351/206 |
| 2007/0122145 | A1 * | 5/2007 | Chang | 396/529 |
| 2007/0280677 | A1 * | 12/2007 | Drake et al. | 396/429 |
| 2011/0134300 | A1 * | 6/2011 | Chung | 348/333.01 |
| 2011/0254955 | A1 * | 10/2011 | Shen | 348/143 |
| 2013/0163980 | A1 * | 6/2013 | Lazaridis et al. | 396/529 |

FOREIGN PATENT DOCUMENTS

JP 59-63351 U 4/1984

* cited by examiner

*Primary Examiner* — Aung S Moe
*Assistant Examiner* — Amy Hsu
(74) *Attorney, Agent, or Firm* — Novak Druce Connolly Bove + Quigg LLP

(57) ABSTRACT

An external lens device mounted in front of an internal camera of a portable electronic device includes an external lens and a positioning mechanism. The positioning mechanism includes a fixing element defining an opening and a sliding element fixing the external lens. The fixing element is slidably mounted on the portable electronic device to enable the opening to align with the internal camera. The sliding element is slidably mounted on the fixing element to enable the external lens to align with the opening and the internal camera. A portable electronic device using the external lens device is also described.

14 Claims, 5 Drawing Sheets

EXTERNAL LENS DEVICE AND PORTABLE ELETRONIC DEVICE USING SAME

BACKGROUND

1. Technical Field

The present disclosure relates to an external lens device, and more particularly to an external lens device arranged in front of an internal camera of a portable electronic device for providing a special focusing effect and a portable electronic device using the external lens device.

2. Description of Related Art

Many portable electronic devices have an internal camera for taking photographs or recording video images. For using the internal camera to obtain a sharp image of the document, an external lens is usually arranged in front of the internal camera. The use of the external lens could change the preset focal length of the internal camera in order to capture the image of either a nearby document or a faraway object. However, an external lens device is usually configured for mounting on a certain type portable electronic device and not suitable for other type devices since different types of devices have different sizes and shapes.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawing like reference numerals designate corresponding parts throughout the views.

DETAILED DESCRIPTION

Figure 1:
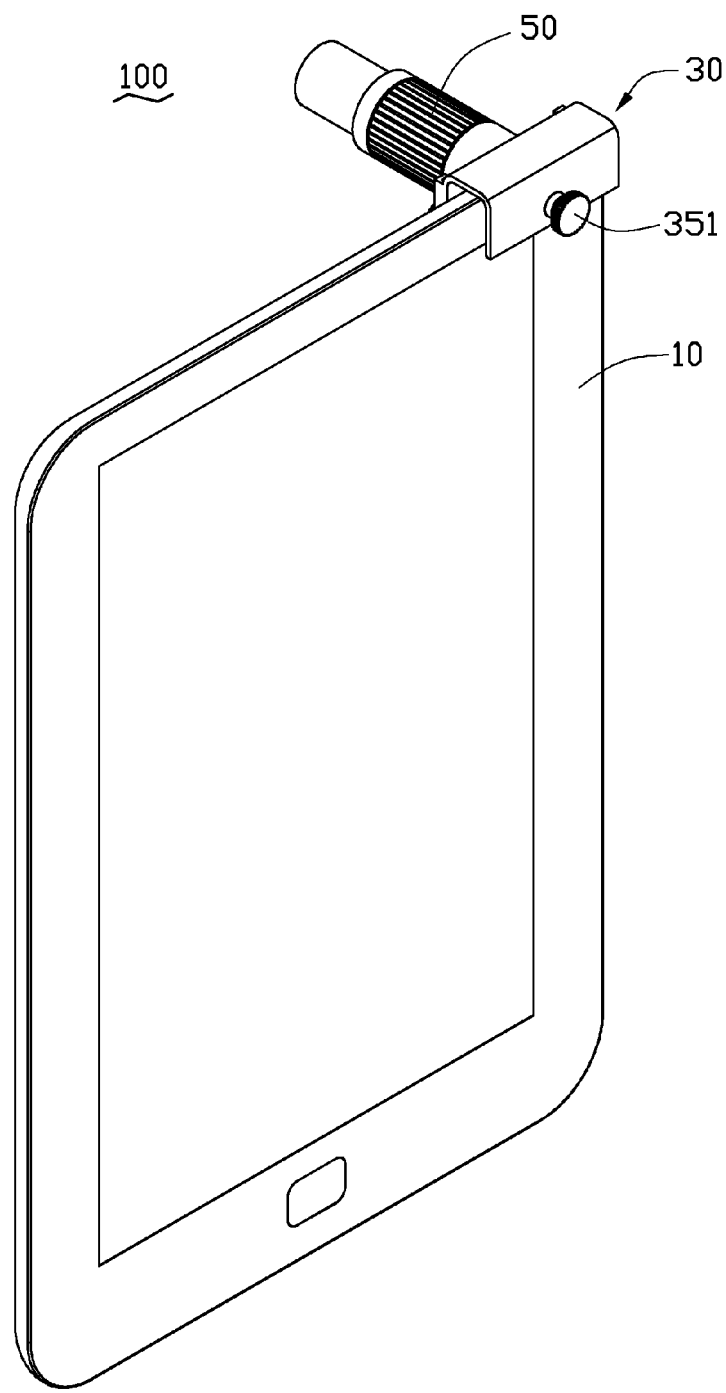
FIG. 1 is an isometric view of a portable electronic device having an external lens device in accordance with an exemplary embodiment.
Figure 2:
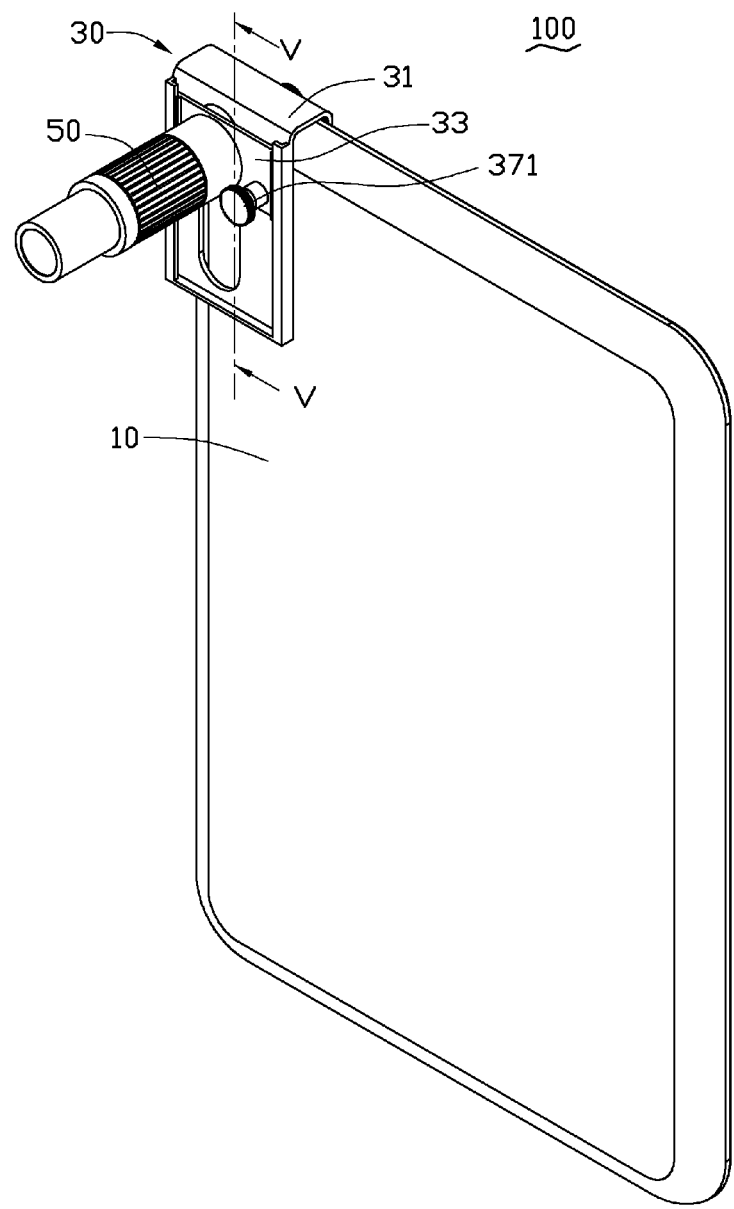
FIG. 2 is an isometric view of the portable electronic device of FIG. 1 viewed from another angle.

FIGS. 1 and 2 show an exemplary embodiment of a portable electronic device 100. The portable electronic device 100 includes a main body 10, an external lens device 20, and an internal camera 70 (see FIG. 4) mounted in the main body 10. The external lens device 20 includes a positioning mechanism 30 and an external lens 50. The positioning mechanism 30 is used for mounting the external lens 50 on the main body 10 in front of the internal camera 70. The external lens 50 may be a long-focal length lens or a wide-angle lens, or a combination, e.g., zoom. In the exemplary embodiment, the external lens 50 is a long-focal length lens. The portable electronic device 100 may be a cellular phone or a tablet computer, for example. In the exemplary embodiment, the portable electronic device 100 is a tablet computer.

The main body 10 includes a rear housing 102 and a front housing 104 opposite to the rear housing 102. The front housing 104 may have a display window 12 and buttons 14. In the exemplary embodiment, the internal camera 70 is secured in the rear housing 102 and located close to an edge 106 of the main body 10.

Figure 3:
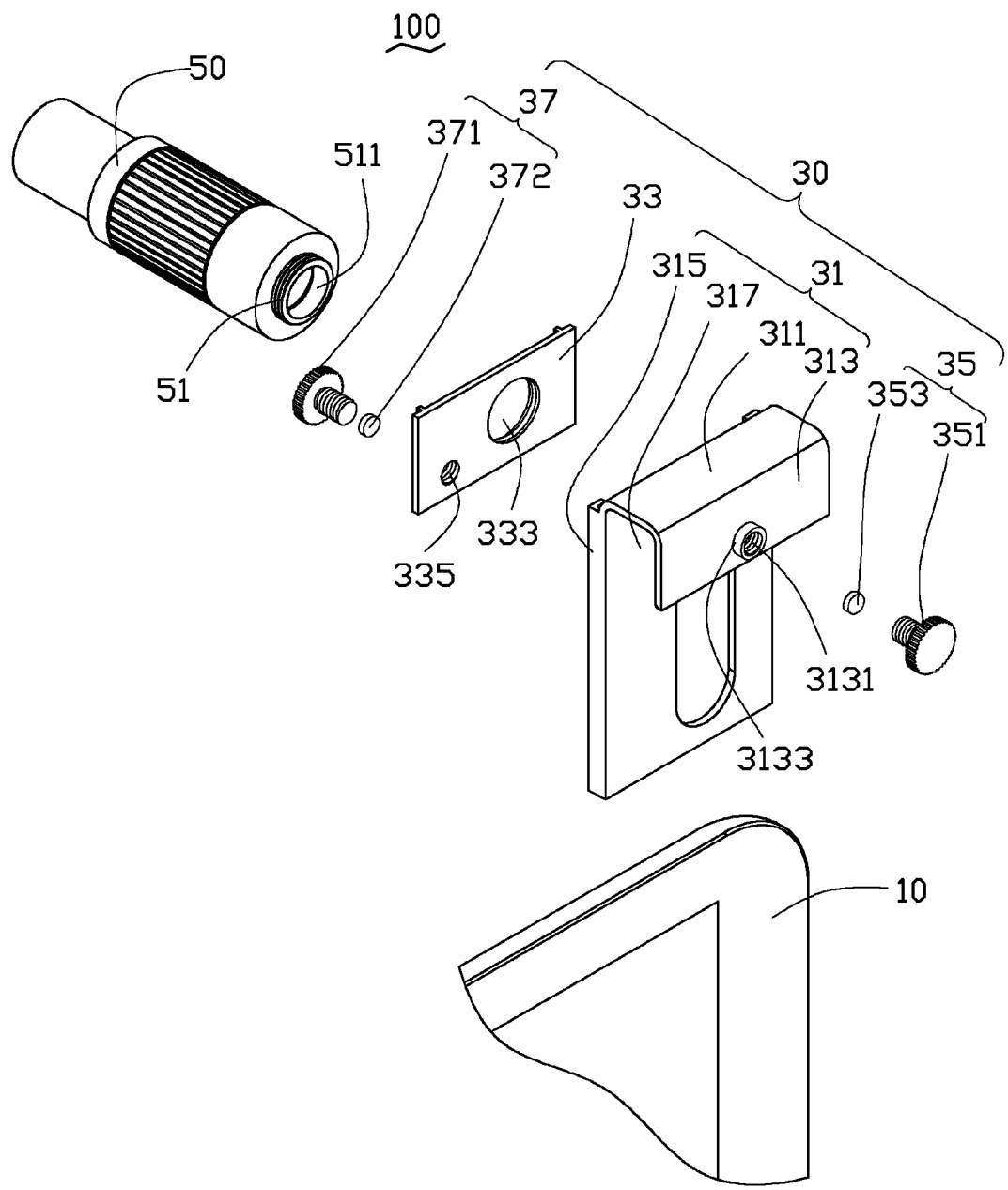
FIG. 3 is an exploded view of the portable electronic device of FIG. 1.

FIGS. 1-3 illustrate one embodiment of the positioning mechanism 30. The positioning mechanism 30 includes a fixing element 31, a sliding element 33, a first fastening assembly 35, and a second fastening assembly 37. The fixing element 31 is removably mounted on the main body 10. The sliding element 33 is slidably mounted on the fixing element 31. The external lens 50 is secured to the sliding element 33. The first fastening assembly 35 fastens the fixing element 31 to the main body 10. The second fastening assembly 37 fastens the sliding element 33 to the fixing element 31.

The fixing element 31 includes a connection portion 311, a fixing portion 313, and a securing portion 315. The fixing portion 313 and the securing portion 315 extend from two opposite ends of the connection portion 311 along the same direction. The fixing portion 313 and the securing portion 315 face each other. That is, the fixing portion 313 and the securing portion 315 are opposite to each other, thereby the fixing portion 313, the securing portion 315, and the connection portion 311 cooperatively defining a first sliding groove 317 (see FIG. 3). The first sliding groove 317 receives an edge portion of the main body 10, thereby securing the fixing element 31 on the main body 10. In the exemplary embodiment, the fixing portion 313 and the securing portion 315 extend perpendicularly from two opposite ends of the connection portion 311, respectively.

The fixing portion 313 defines a first screw hole 3131 through the fixing portion 313. The first screw hole 3131 and the first fastening assembly 35 cooperatively fasten the fixing element 31 to the main body 10. In the exemplary embodiment, the fixing portion 313 further has a first pillar 3133 protruding from a surface away from the securing portion 315. The first screw hole 3131 runs through the first pillar 3133 along an axial direction of the first pillar 3133. The first pillar 3133 lengthens the first screw hole 3131. In other embodiments, the first pillar 3133 may be omitted.

Figure 4:
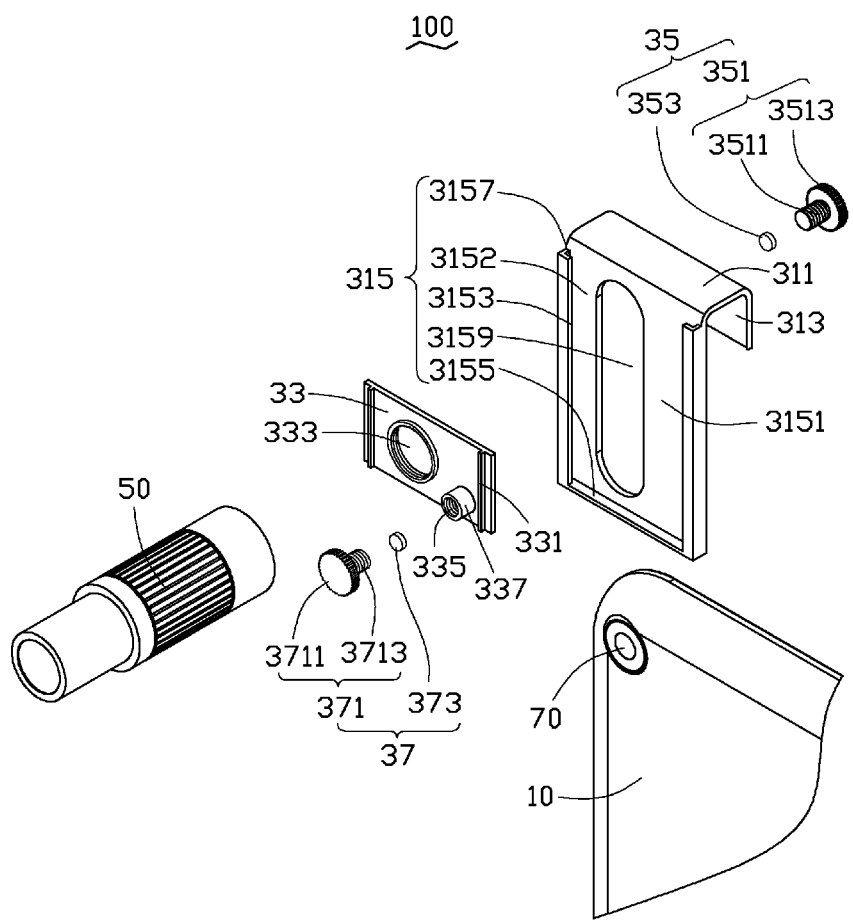
FIG. 4 is an exploded view of the portable electronic device of FIG. 2.

Referring to FIG. 4, a sliding space 3151 is defined in the securing portion 315. The sliding element 33 slides in the sliding space 3151 relative to the fixing element 31. In the exemplary embodiment, the securing portion 315 includes a bottom board 3152, two side walls 3153 oppositely protruding from the bottom board 3152, and an end wall 3155 connecting the two side walls 3153. The bottom board 3152, the two side walls 3153, and the end wall 3155 cooperatively define the sliding space 3151. Each side wall 3153 extends perpendicularly from the bottom board 3152 and then bends towards another side wall 3153 (or the sliding space 3151), thereby forming a second sliding groove 3157 between the bottom board 3152 and the side walls 3153. The second sliding grooves 3157 are used to slidably receive two opposite ends of the sliding element 33, respectively. The end wall 3155 seals an end of each second sliding groove 3157 to limit a sliding route of the sliding element 33, preventing the sliding element 33 from sliding out of the sliding space 3151.

The securing portion 315 further includes an opening 3159 defined in the bottom board 3152 substantially at a middle position. The opening 3159 extends along the second sliding grooves 3157 to be substantially oval with two ends semi-circle-shaped. The opening 3159 enables light transmission between the external lens 50 and the internal camera 70. When the fixing element 31 is mounted on the main body 10, the fixing portion 313 and the securing portion 315 are located at two sides of the edge 106 of the main body 10 close to the internal camera 70. The opening 3159 is adjusted to be aligned with the internal camera 70 by sliding the fixing element 31 along the edge 106.

The sliding element 33 has two protruding strips 331 separately protruding from a surface thereof. Each protruding strip 331 protrudes from a position close to one of the ends of the sliding element 33. When the sliding element 33 is mounted on the fixing element 31, the two ends of the sliding element 33 are slidably received in the two second sliding grooves 3157, respectively, with the two protruding strips 331 abutting the two side walls 3153 of the fixing element 31. Therefore, the two ends of the sliding element 33 are locked in the two second sliding grooves 3157 by the two protruding strips 331.

In the exemplary embodiment, the external lens 50 is threadedly secured to the sliding element 33. For improved clarity, the sliding element 33 defines a threaded hole 333 through the sliding element 33 and corresponding to the opening 3159. The external lens 50 has a screw bolt 51 protruding from one end (see FIG. 3). The screw bolt 51 defines a hole 511 along the axial direction and communicating with the interior of the external lens 50. The threaded hole 333 can be adjusted to be coaxial with the internal camera 70 through the opening 3159 by sliding the sliding element 33 along the second sliding groove 3157. As thus, when the external lens 50 is screwed into the threaded hole 333, the external lens 50 can be coaxial with the internal camera 70 through the opening 3159. Alternatively, the external lens 50 may be secured to the sliding element 33 by other structures, such as clasps and claws.

The sliding element 33 further defines a second screw hole 335. The second screw hole 335 and the second fastening assembly 37 cooperatively fasten the sliding element 33 onto the fixing element 31. In the exemplary embodiment, the sliding element 33 further has a second pillar 337 protruding from the surface having the two protruding strips 331. The second screw hole 335 is defined along the axial direction of the second pillar 337 and through the second pillar 337. The second pillar 337 lengthens the second screw hole 335. In other embodiments, the second pillar 337 may be omitted.

The first fastening assembly 35 includes a first screw 351 and a first rubber washer 353. The first screw 351 is screwed into the first screw hole 3131. The first rubber washer 353 abuts an end of the first screw 351 and the fixing portion 313 of the fixing element 31.

Figure 5:
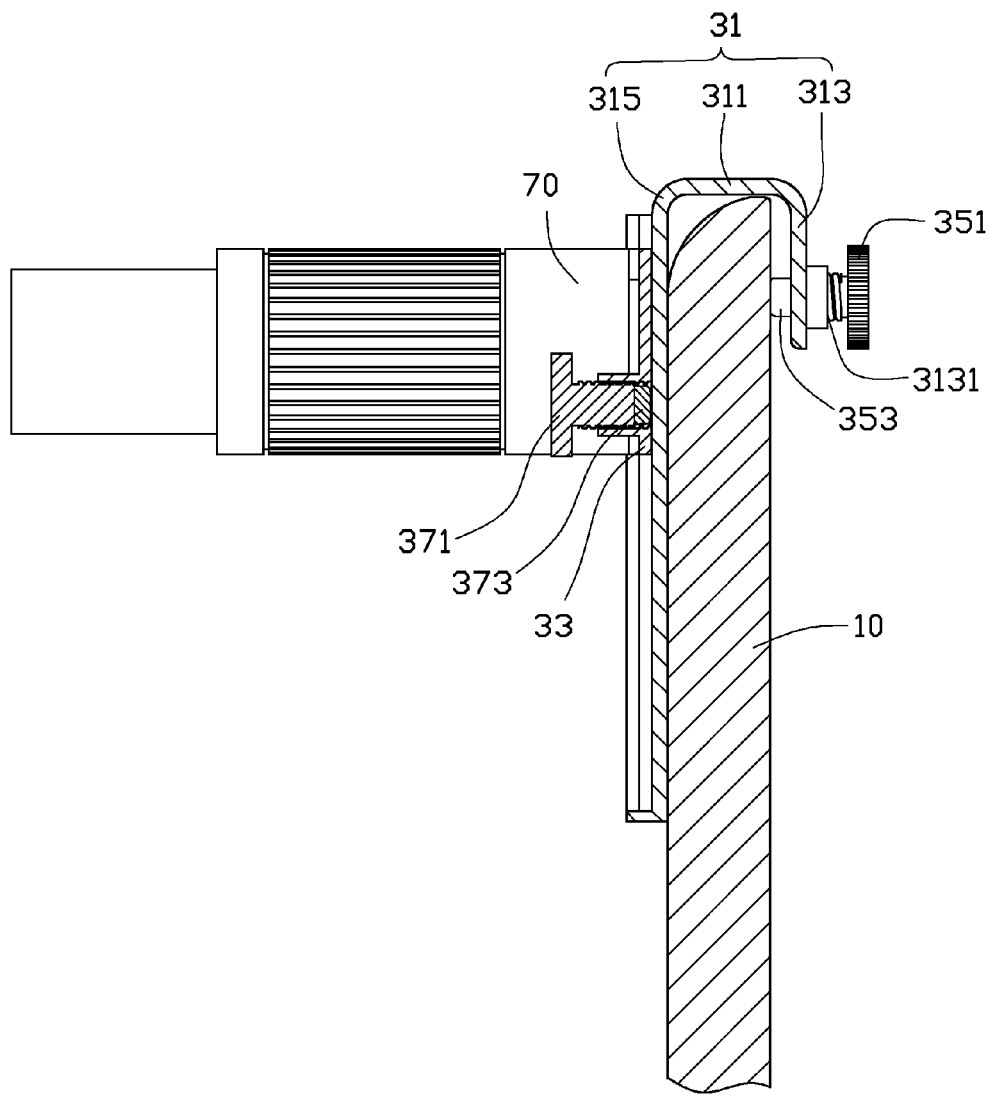
FIG. 5 is a cross-sectional view of the portable electronic device of FIG. 1 taken along line V-V.

Referring to FIG. 5, to mount the fixing element 31 to the main body 10, the fixing portion 313 and the securing portion 315 are located at two sides of the main body 10. Then the first screw 351 is screwed into the first screw hole 3131 until the first rubber washer 353 abuts the main body 10, thus, the main body 10 is clamped between the securing portion 315 and the first rubber washer 353. The first rubber washer 353 protects the main body 10 from being scratched by the first screw 351 and provides a big friction force preventing the fixing element 31 from moving relative to the main body 10.

The second fastening assembly 37 includes a second screw 371 and a second rubber washer 373. The second screw 371 is screwed into the second screw hole 335. The second rubber washer 373 abuts an end of the second screw 371 and the securing portion 315 of the fixing element 31. To mount the sliding element 33 to the fixing element 31, the second screw 371 is screwed into the second screw hole 335 until the second rubber washer 373 tightly abuts the bottom board 3152 of the fixing element 31. Thus, the friction force between the second rubber washer 373 enables the sliding element 33 to be fixed relative to the securing portion 315.

In use, the external lens device 20 can be released from the main body 10 by unscrewing the first screw 351 to release the abutment between the first rubber washer 353 and the main body 10. To positioning the external lens 50 on another portable electronic device having a different shape, the opening 3159 of the fixing element 31 can be adjusted to be aligned with the internal camera of the portable electronic device by adjusting the relative position of the fixing element 31 on the portable electronic device. Then, the external lens 50 and the opening 3159 are adjusted to be aligned with the internal camera by adjusting the position of the sliding element 33 in the sliding space 3151. As a result, the external lens device 20 can be positioned on different shaped portable electronic devices.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An external lens device used for a portable electronic device, the portable electronic device including an internal camera located therein, the external lens device comprising:
an external lens; and
a positioning mechanism, the positioning mechanism comprising:
a fixing element defining an opening, the fixing element slidably mounted on the portable electronic device to enable the opening aligned with the internal camera; and
a sliding element fastening the external lens, the sliding element slidably mounted on the fixing element to enable the external lens aligned with the opening and the internal camera;
wherein the fixing element includes a connection portion, a fixing portion, and a securing portion; the fixing portion and the securing portion extend from two opposite ends of the connection portion along the same direction and face to each other, thereby the fixing portion, the securing portion, and the connection portion cooperatively defining a first sliding groove to slidably receive an edge portion of the portable electronic device; the securing portion includes a bottom board, two side walls oppositely protruding from the bottom board; the bottom board and the two side walls cooperatively define a sliding space; each side wall extends perpendicularly from the bottom board and then bends towards the sliding space to form a second sliding groove between the bottom board and the side walls; the second sliding grooves slidably receives two opposite ends of the sliding element.

2. The external lens device as claimed in claim 1, wherein the sliding element defines a threaded hole through the sliding element and corresponding to the opening; the external lens is screwed into the threaded hole; the sliding element slides relative to the fixing element to enable the external lens to be coaxial with the internal camera through the opening.

3. The external lens device as claimed in claim 1, wherein the positioning mechanism further includes a first fastening assembly, the first fastening assembly includes a first screw; the fixing portion defines a first screw hole through the fixing portion; the first screw is screwed into the first screw hole to fasten the fixing element on the portable electronic device.

4. The external lens device as claimed in claim 3, wherein the first fastening assembly further includes a first rubber washer, the first screw abuts the fixing portion through the first rubber washer.

5. The external lens device as claimed in claim 1, wherein the securing portion further includes an end wall connecting the two side walls; the end wall seals an end of each second sliding groove to limit a sliding route of the sliding element in the sliding space.

6. The external lens device as claimed in claim 1, wherein the sliding element has two protruding strips each protruding from a position close to one of the ends of the sliding element; when the sliding element is mounted on the fixing element, the two protruding strips abuts the two side walls.

7. The external lens device as claimed in claim 1, wherein the sliding element further defines a second screw hole; the positioning mechanism further includes a second fastening assembly, the second fastening assembly includes a second screw; the second screw is screwed into the second screw hole to fasten the sliding element on the fixing element.

8. The external lens device as claimed in claim 7, wherein the second fastening assembly further includes a second rubber washer, the second screw abuts the securing portion through the second rubber washer.

9. A portable electronic device, comprising:
a main body;
an internal camera located in the main body; and
an external lens device comprising:
an external lens; and
a positioning mechanism, the positioning mechanism comprising:
a fixing element defining an opening, the fixing element slidably mounted on the main body to enable the opening aligned with the internal camera; and
a sliding element fixing the external lens, the sliding element slidably mounted on the fixing element to enable the external lens aligned with the opening and the internal camera;
wherein the fixing element includes a connection portion, a fixing portion, and a securing portion; the fixing portion and the securing portion extend from two opposite ends of the connection portion along the same direction and face each other, thereby the fixing portion, the securing portion, and the connection portion cooperatively defining a first sliding groove to slidably receive an edge portion of the main body; the securing portion includes a bottom board, two side walls oppositely protruding from the bottom board; the bottom board and the two side walls cooperatively define a sliding space; each side wall extends perpendicularly from the bottom board and then bends towards the sliding space to form a second sliding groove between the bottom board and the side walls; the second sliding grooves slidably receives two opposite ends of the sliding element.

10. The portable electronic device as claimed in claim 9, wherein the sliding element defines a threaded hole through the sliding element and corresponding to the opening; the external lens is screwed into the threaded hole; the sliding element slides relative to the fixing element to enable the external lens to be coaxial with the opening.

11. The portable electronic device as claimed in claim 9, wherein the positioning mechanism further includes a first fastening assembly, the first fastening assembly includes a first screw; the fixing portion defines a first screw hole through the fixing portion; the first screw is screwed into the first screw hole to fasten the fixing element on the main body.

12. The portable electronic device as claimed in claim 11, wherein the first fastening assembly further includes a first rubber washer, the first screw abuts the fixing portion through the first rubber washer.

13. The external lens device as claimed in claim 9, wherein the sliding element further defines a second screw hole; the positioning mechanism further includes a second fastening assembly, the second fastening assembly includes a second screw; the second screw is screwed into the second screw hole to fasten the sliding element on the fixing element.

14. The portable electronic device as claimed in claim 9, wherein the main body includes a rear housing and a front housing opposite to the rear housing; the front housing has a display window and buttons; the internal camera is secured in the rear housing.

\* \* \* \* \*